(12) United States Patent
Dudar (10) Patent No.: US 9,759,166 B2
(45) Date of Patent: Sep. 12, 2017

(54) SYSTEMS AND METHODS FOR EVAPORATIVE EMISSIONS TESTING

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 14/849,324

(22) Filed: Sep. 9, 2015

(65) Prior Publication Data

US 2017/0067414 A1    Mar. 9, 2017

(51) Int. Cl.
| | | |
|---|---|---|
| *G01M 17/00* | (2006.01) | |
| *G06F 7/00* | (2006.01) | |
| *G06F 11/30* | (2006.01) | |
| *G06F 19/00* | (2011.01) | |
| *G07C 5/00* | (2006.01) | |
| *F02M 25/08* | (2006.01) | |
| *G07C 5/08* | (2006.01) | |
| *G01M 3/02* | (2006.01) | |
| *G05B 23/00* | (2006.01) | |

(52) U.S. Cl.
CPC .... *F02M 25/0809* (2013.01); *F02M 25/0854* (2013.01); *G01M 3/025* (2013.01); *G05B 23/00* (2013.01); *G07C 5/0808* (2013.01); *G07C 5/0816* (2013.01)

(58) Field of Classification Search
CPC .......... F02M 25/0809; F02M 25/0854; G01M 3/025; G07C 5/0808; G07C 5/0816; G05B 23/00

USPC ........................................................ 701/29.2
See application file for complete search history.

(56) References Cited

U.S. PATENT DOCUMENTS

| | | |
|---|---|---|
| 6,073,487 A | 6/2000 | Dawson |
| 6,216,674 B1 | 4/2001 | Corkill |
| 6,530,265 B2 | 3/2003 | Dawson et al. |
| 6,820,466 B2 | 11/2004 | Streib |
| 6,854,321 B2 | 2/2005 | Amlin |
| 7,043,375 B2 | 5/2006 | Streib |
| 7,086,276 B2 | 8/2006 | Cook et al. |
| 7,216,636 B2 | 5/2007 | Hurley |
| 7,562,560 B1 | 7/2009 | Perry |
| 8,327,691 B2 | 12/2012 | Drane et al. |
| 8,849,503 B1 * | 9/2014 | Dudar ................ F02M 25/0809 701/32.3 |
| 2001/0042399 A1 * | 11/2001 | Dawson ............. F02M 25/0809 73/49.7 |
| 2009/0133672 A1 | 5/2009 | Crisan |

(Continued)

*Primary Examiner* — Calvin Cheung
*Assistant Examiner* — Paula L Schneider
(74) *Attorney, Agent, or Firm* — James Dottavio; McCoy Russell LLP (57) ABSTRACT

Methods and systems are provided for diagnosing degradation of an evaporative emissions system in a vehicle. One example method comprises following a vehicle-off event, waking an electronic controller to indicate an absence of a leak in the evaporative emissions system responsive to vacuum in the evaporative emissions system attaining a vacuum threshold, the vacuum threshold based on ambient conditions and fuel conditions at the vehicle-off event. The vacuum threshold may vary based on existing conditions and may enable a more reliable diagnosis of a status of the evaporative emissions system.

19 Claims, 5 Drawing Sheets

(56) References Cited

U.S. PATENT DOCUMENTS

| | | |
|---|---|---|
| 2010/0064774 A1 | 3/2010 | Drane et al. |
| 2014/0297071 A1 | 10/2014 | Dudar et al. |
| 2016/0025588 A1* | 1/2016 | Dudar .................... G01K 3/14 73/40.5 R |
| 2016/0177882 A1* | 6/2016 | Dudar ................ F02D 41/0032 701/22 |

* cited by examiner

SYSTEMS AND METHODS FOR EVAPORATIVE EMISSIONS TESTING

FIELD

The present description relates generally to methods and systems for testing an evaporative emissions control system for degradation.

BACKGROUND/SUMMARY

Evaporative emissions control systems in vehicles may be configured to store fuel vapors from fuel tank refueling and diurnal engine operations, and then purge the stored vapors during a subsequent engine operation. In an effort to meet stringent federal emissions regulations, evaporative emissions control systems may be intermittently diagnosed for the presence of vapor leaks that could release fuel vapors to the atmosphere.

Hybrid vehicles and other vehicles with inherently low manifold vacuum may perform leak tests for vapor leaks while the vehicle is turned off. In some examples, the leak test is based on natural pressure or vacuum that occurs in the fuel tank due to fuel heating or cooling. An example approach to infer degradation of the evaporative emissions control system based on natural vacuum following engine-off is shown by Dawson in U.S. Pat. No. 6,073,487. Herein, a leak test includes sealing the fuel system and the evaporative emissions control system following the engine shut-off event and monitoring changes in pressure within the evaporative emissions control system. As such, cooling of fuel within the fuel system generates a vacuum, and integrity of the evaporative emissions control system is determined based on the vacuum attaining a threshold. If the vacuum attains the threshold, a vacuum switch is closed and a controller determines that the system is robust. On the other hand, if vapor leaks are present, vacuum in the evaporative emissions control system does not reach the threshold, and the vacuum switch may not close. In response to the vacuum switch remaining open, the controller determines that vapor leaks are present in the evaporative emissions control system.

The inventors herein though have recognized a potential issue with such approaches. As an example, the vacuum switch may be a mechanical switch (e.g., including a diaphragm) that is designed to close when vacuum in the evaporative emissions control system reaches the threshold. In other words, the vapor leak test may rely on a threshold that is a single constant value based on the design of the vacuum switch. However, in regions that experience low diurnal temperature variations (e.g., wherein temperature variation over a given day is lower), the fuel may not experience significant cooling to generate sufficient vacuum. Accordingly, the vapor leak test may indicate degradation despite the evaporative emissions control system being robust (e.g., a false fail). On the other hand, during windy conditions or when a thunderstorm is occurring, vacuum in the fuel system can attain the threshold easily and may result in the evaporative emissions control system being declared robust even though vapor leaks may be present (e.g., a false pass). Thus, leak tests using the mechanical vacuum switch based on the single constant value threshold may produce unreliable results. Further, if vapor leaks are not diagnosed accurately, the vehicle may either not be emissions compliant (due to the false pass) or may lead to unnecessary expenses to the vehicle operator due to potentially needless vehicle service (due to false fails).

The inventors herein have recognized the above issue and have developed systems and methods to at least partially address them. One example approach includes a method comprising following a vehicle-off event, waking an electronic controller to indicate an absence of a leak in an evaporative emissions system responsive to vacuum in the evaporative emissions system attaining a vacuum threshold, the vacuum threshold determined at the vehicle-off event by the electronic controller and the vacuum threshold based on ambient conditions and fuel conditions. In this way, the vacuum threshold may be a variable threshold. A technical effect of using a threshold that varies based on ambient and fuel conditions is that the leak test may be more robust.

In another example, a method may comprise controlling fuel delivered to an engine by a controller, before turning off the controller after shutdown of the engine, estimating pressure an evaporative emissions system would achieve after the shutdown based on ambient conditions and fuel conditions, and determining whether a vapor leak exists in the evaporative emissions system after the controller turnoff in response to a comparison of actual pressure of the evaporative emissions system to the estimated pressure. In this way, the vapor leak test may occur with lower power consumption during engine shutdown.

In yet another example, a system for a vehicle may comprise a fuel system including a fuel tank, an evaporative emissions system coupled to the fuel system, a pressure sensor coupled to the evaporative emissions system and the fuel system, the pressure sensor measuring a pressure in the evaporative emissions system and fuel system, a powertrain control module comprising a wake input, and a comparator circuit coupled to the wake input, the powertrain control module configured with instructions stored in non-transitory memory that when executed cause the powertrain control module to, in response to a vehicle-off event, estimate a vacuum threshold based on each of ambient conditions and fuel conditions, sleep following estimating the vacuum threshold while maintaining the comparator circuit awake, and responsive to vacuum in the evaporative emissions system reaching the vacuum threshold, wake up and indicate a robust evaporative emissions system, and sleep following the indication. In this way, the vacuum threshold may be different for each leak test. Further, by using the pressure sensor, instead of a mechanical switch, different vacuum thresholds may be sensed. Further still, the leak test may provide more accurate results as existing ambient conditions and fuel conditions are taken into account when determining the vacuum threshold. Overall, performance of the evaporative emissions control system may be enhanced and the vehicle may be emissions compliant.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
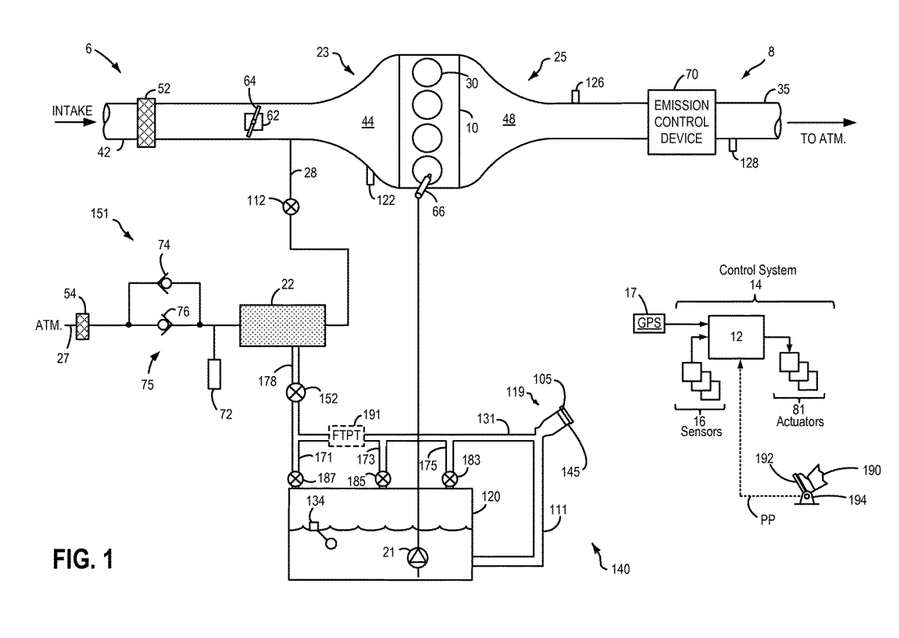
FIG. 1 schematically shows a fuel system and an evaporative emissions system in a vehicle.
Figure 3:
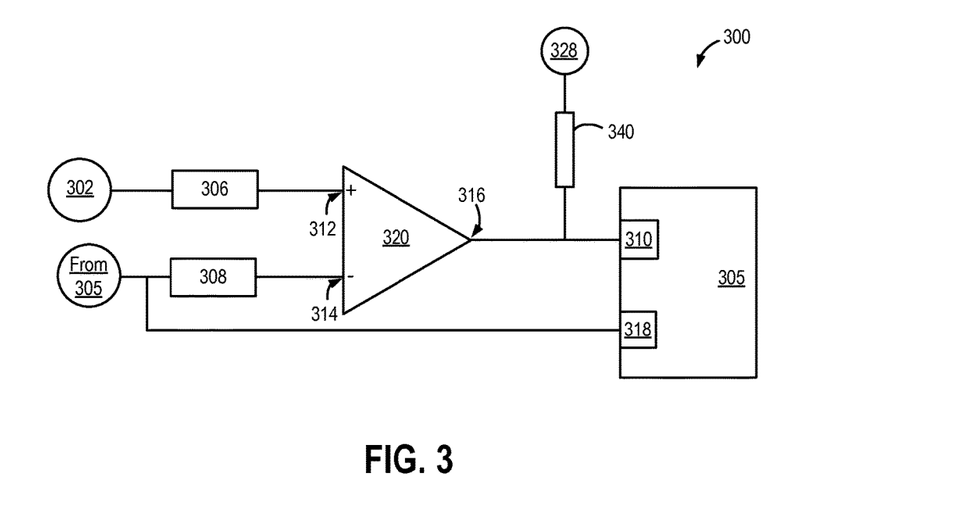
FIG. 3 presents a schematic circuit for waking up a powertrain control module.
Figure 4A:
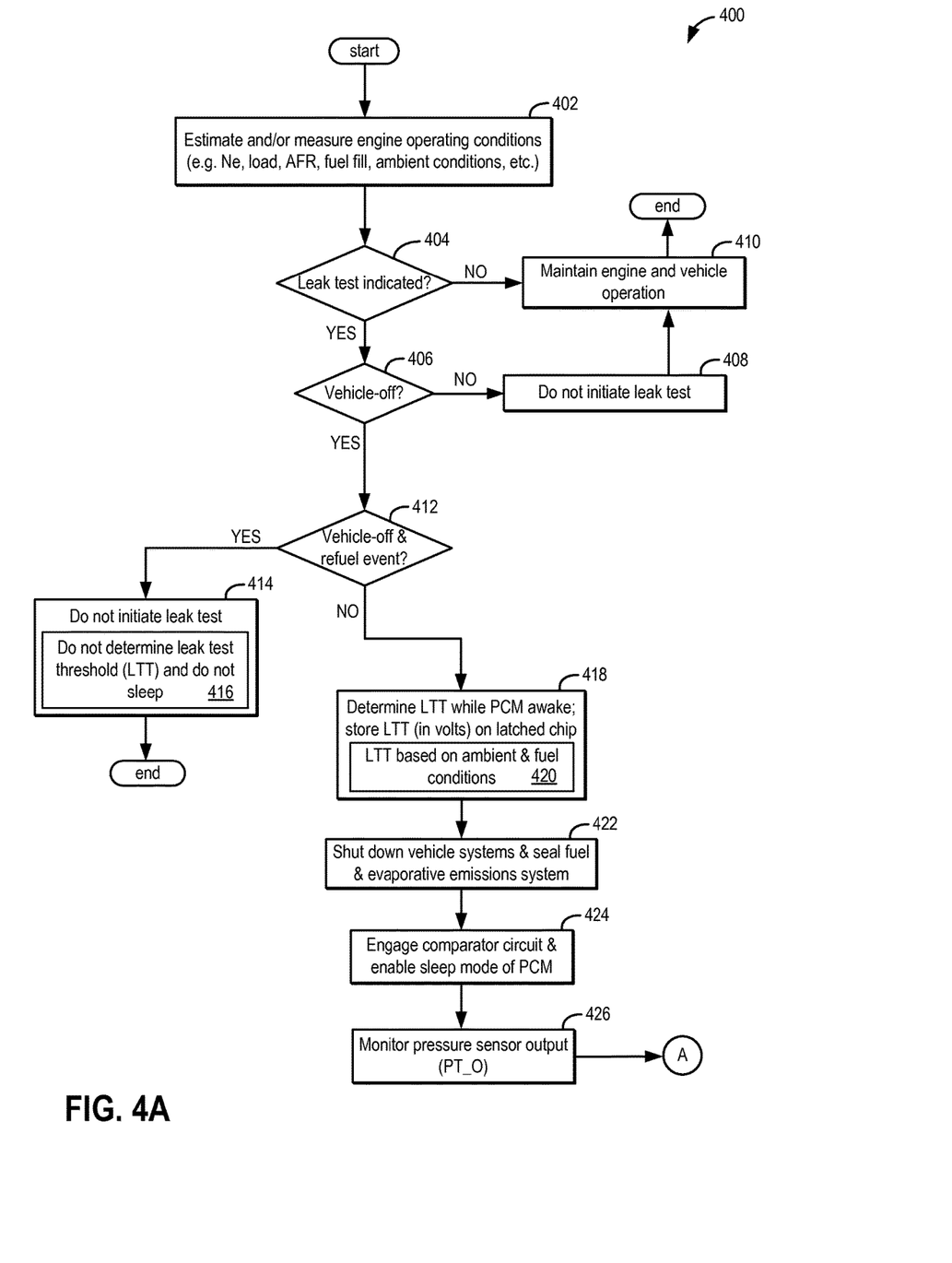
FIGS. 4A and 4B portray a high level flow chart for a leak test of the fuel system and evaporative emissions system, in accordance with the present disclosure.
Figure 4B:
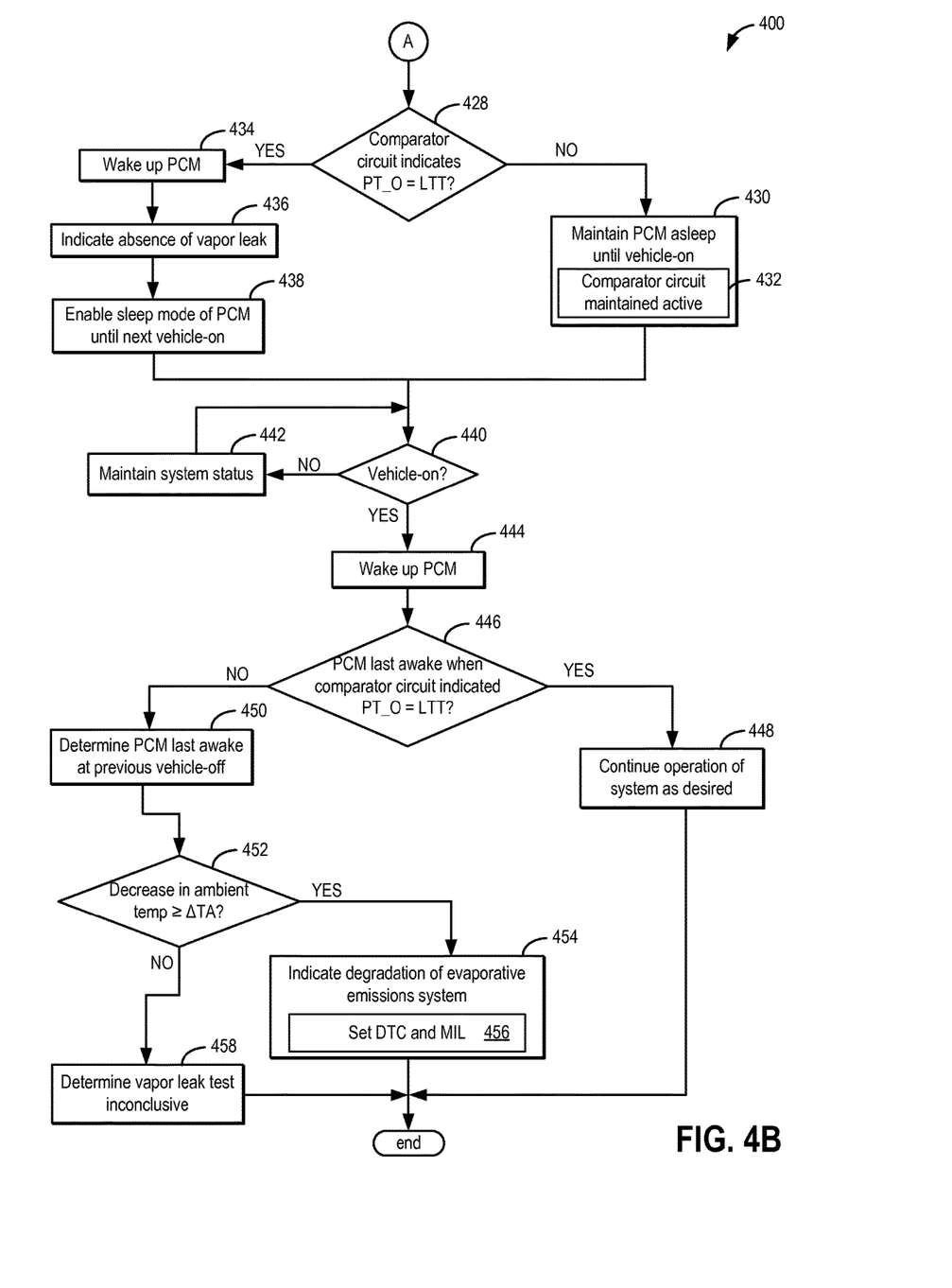

The following description relates to systems and methods for testing an evaporative emissions control system in a vehicle, such as the example vehicle system of FIG. 1, for degradation. Specifically, the evaporative emissions system may be tested for vapor leaks. An electronic controller of the vehicle may determine a leak test threshold (also termed, vacuum threshold) at a vehicle-off event based on existing ambient conditions and fuel conditions at the vehicle-off event. The leak test threshold may be determined as a pressure. The electronic controller may convert the leak test threshold to a voltage based on the example transfer function of FIG. 2 and may store it as a latched voltage. Upon determining the leak test threshold, the electronic controller may sleep. As such, the electronic controller may comprise a wake input coupled to a comparator circuit, as depicted in FIG. 3. The comparator circuit may be configured to wake up the electronic controller when an output of a pressure sensor (in volts) coupled to the fuel system and the evaporative emissions control system reaches the leak test threshold (in volts). Upon waking up in response to vacuum in the evaporative emissions system reaching the leak test threshold, the electronic controller may indicate that a leak is absent in the evaporative emissions system (FIGS. 4A and 4B). Example leak tests based on FIGS. 4A and 4B are shown in a timeline included in FIG. 5.

Regarding terminology used herein, a vacuum may also be termed "negative pressure". Both vacuum and negative pressure refer to a pressure lower than atmospheric pressure. Further, an increase in vacuum indicates a higher level of vacuum as the vacuum approaches absolute zero pressure or perfect vacuum. When vacuum decreases, a level of vacuum reduces as the vacuum approaches atmospheric pressure level. In other words, a lower amount of vacuum indicates a shallow level of vacuum. Said another way, lower vacuum may be a negative pressure that is closer to atmospheric pressure than a deeper or higher level of vacuum.

FIG. 1 shows a schematic depiction of a vehicle system 6. The vehicle system 6 includes an engine system 8 coupled to an evaporative emissions control system 151 (also termed, an evaporative emissions system 151 or fuel vapor recovery system) and a fuel system 140. As such, the evaporative emissions system 151 may be coupled to the fuel system 140. Emission control system 151 includes a fuel vapor container or canister 22 which may be used to capture and store fuel vapors. In some examples, vehicle system 6 may be a hybrid electric vehicle system.

The engine system 8 may include an engine 10 having a plurality of cylinders 30. Engine 10 may be controlled at least partially by a control system 14 including a controller 12 and by input from a vehicle operator 190 via an input device 192. In this example, input device 192 includes an accelerator pedal and a pedal position sensor 194 for generating a proportional pedal position signal PP.

Engine 10 includes an engine intake 23 and an engine exhaust 25. The engine intake 23 includes a throttle 62 coupled within intake manifold 44. Fresh intake air enters intake passage 42 and flows through air filter 52 before streaming past throttle 62 (also termed intake throttle 62). Throttle 62 includes a throttle plate 64, and in the depicted example a position of the intake throttle 62 (specifically, a position of the throttle plate 64) may be varied by controller 12 of control system 14 via a signal provided to an electric motor or actuator included with intake throttle 62, a configuration that is commonly referred to as electronic throttle control (ETC). In this manner, throttle 62 may be operated to vary an amount of intake air provided to intake manifold 44 and the plurality of cylinders therein.

The engine exhaust 25 includes an exhaust manifold 48 leading to an exhaust passage 35 that routes exhaust gas to the atmosphere. The engine exhaust 25 may include one or more emission control devices 70 (also termed emissions catalyst), which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 140 may include a fuel tank 120 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each of the plurality of cylinders 30. It will be appreciated that fuel system 140 may be a return-less fuel system, a return fuel system, or various other types of fuel system. Fuel tank 120 may hold a plurality of fuel blends, including fuel with a range of alcohol concentrations, such as various gasoline-ethanol blends, including E10, E85, gasoline, etc., and combinations thereof. A fuel level sensor 134 located in fuel tank 120 may provide an indication of the fuel level ("Fuel Level Input") to controller 12. As depicted, fuel level sensor 134 may comprise a float connected to a variable resistor. Alternatively, other types of fuel level sensors may be used.

Vapors generated in fuel system 140 may be routed to evaporative emissions control system 151, specifically to fuel vapor canister 22 via vapor recovery line 131 and conduit 178, before being purged to the engine intake 23. Fuel vapor canister 22 may also be termed fuel system canister or simply, canister 22 herein. Vapor recovery line 131 may be coupled to fuel tank 120 via one or more conduits and may include one or more valves for isolating the fuel tank during certain conditions. For example, vapor recovery line 131 may be coupled to fuel tank 120 via one or more or a combination of conduits 171, 173, and 175.

Further, in some examples, one or more fuel tank vent valves may be included in conduits 171, 173, or 175. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 171 may include a grade vent valve (GVV) 187, conduit 173 may include a fill limit venting valve (FLVV) 185, and conduit 175 may include a grade vent valve (GVV) 183. Further, in some examples, recovery line 131 may be coupled to a fuel filler system 119. In some examples, fuel filler system 119 may include a fuel cap 105 for sealing off the fuel filler system from the atmosphere. Fuel filler system 119 may also be termed refueling system 119. Refueling system 119 is coupled to fuel tank 120 via a fuel filler pipe or neck 111.

Further, refueling system 119 may include refueling lock 145. In some embodiments, refueling lock 145 may be a fuel cap locking mechanism. The fuel cap locking mechanism may be configured to automatically lock the fuel cap in a closed position so that the fuel cap cannot be opened. For example, the fuel cap 105 may remain locked via refueling lock 145 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 145 may be a filler pipe valve located at a mouth of fuel filler pipe 111. In such embodiments, refueling lock 145 may not prevent the removal of fuel cap 105. Rather, refueling lock 145 may prevent the insertion of a refueling pump into fuel filler pipe 111. The filler pipe valve may be electrically locked, for example by a solenoid, or mechanically locked, for example by a pressure diaphragm.

In some embodiments, refueling lock 145 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 145 is locked using an electrical mechanism, refueling lock 145 may be unlocked by commands from controller 12, for example, when a fuel tank pressure decreases below a pressure threshold. In embodiments where refueling lock 145 is locked using a mechanical mechanism, refueling lock 145 may be unlocked via a pressure gradient, for example, when a fuel tank pressure decreases to atmospheric pressure.

Fuel vapor canister 22 in evaporative emissions control system 151 may be filled with an appropriate adsorbent to temporarily trap fuel vapors (including vaporized hydrocarbons). In one example, the adsorbent used is activated charcoal. While a single canister 22 is shown, it will be appreciated that fuel system 140 may include any number of canisters. When purging conditions are met, such as when the canister is saturated, vapors stored in fuel vapor canister 22 may be purged to engine intake 23 by opening canister purge valve 112. In one example, canister purge valve 112 may be a solenoid valve wherein opening or closing of the valve is performed via actuation of a canister purge solenoid.

Canister 22 is fluidically coupled to atmosphere via a vent line 27 and air filter 54. As such, air stripped of fuel vapors may be routed out of canister 22 to the atmosphere when storing, or trapping, fuel vapors from fuel tank 120. Vent line 27 may also allow fresh air to be drawn into fuel vapor canister 22 when purging stored fuel vapors to engine intake 23 via purge line 28 and canister purge valve 112. While this example shows vent line 27 communicating with fresh, unheated air, various modifications may also be used.

Vent line 27 also includes a leak detection system 75 coupled between air filter 54 and canister 22. The leak detection system 75 may test the evaporative emissions system 151 for vapor leaks. Leak detection system (LDS) 75 comprises a pressure sensor 72, a vacuum relief valve 74, and a pressure relief valve 76. The vacuum relief valve 74 and the pressure relief valve 76 are arranged in parallel to each other. The vacuum relief valve may allow fluid flow in a first direction while blocking fluid flow in a second direction, the first direction being opposite to the second direction. On the other hand, the pressure relief valve may allow fluid flow in the second direction while blocking fluid flow in the first direction. Specifically, vacuum relief valve 74 may permit air flow from atmosphere into canister 22 while pressure relief valve 76 enables fluid flow from canister 22 towards air filter 54 (and atmosphere).

Each of the relief valves may include a ball and spring mechanism that seats and seals at a specified pressure differential, for example. The pressure differential set-point at which each relief valve may be configured to open and allow fluid flow may be a pre-set value. Pressure sensor 72 is positioned along vent line 27 between canister 22 and each of the vacuum relief valve 74 and the pressure relief valve 76. Pressure sensor 72 may monitor positive pressure as well as negative pressure in the system. Alternative embodiments with distinct positions of the vacuum relief valve 74, pressure relief valve 76, as well as pressure sensor 72 may be contemplated without departing from the scope of this disclosure.

The vacuum relief valve 74 and the pressure relief valve 76 may protect the fuel system 140 (and the evaporative emissions system 151) from higher than desired vacuum levels and positive pressures, respectively. A positive pressure herein indicates a pressure higher than atmospheric pressure while a higher vacuum indicates a deeper vacuum (e.g. negative pressure closer to perfect vacuum). Specifically, if the evaporative emissions control system develops a vacuum that is higher than desired, fresh air may flow into the evaporative emissions system via vacuum relief valve 74 and reduce the vacuum level. Similarly, if the positive pressure within the evaporative emission control system exceeds a threshold, the positive pressure is relieved via pressure relief valve 76. Pressure sensor 72 monitors pressure (positive and negative) within the fuel system and the evaporative emissions system.

Fuel system canisters may receive refueling vapors generated during fuel tank refilling operation, diurnal vapors generated during daily changes in ambient temperature, as well as "running loss" vapors (that is, fuel vaporized during vehicle operation). In plug-in hybrid electric vehicles (PHEVs), the fuel system canister may only receive refueling vapors and diurnal vapors, as running loss vapors may be blocked from entering the canister during vehicle operation by isolating the fuel tank via closing fuel tank isolation valve (FTIV) 152. Closing the FTIV 152 may comprise completely blocking fluid flow therethrough.

During engine operation, FTIV 152 may be kept closed in PHEVs to limit the amount of diurnal or "running loss" vapors directed to canister 22 from fuel tank 120. During refueling operations, and selected purging conditions, FTIV 152 may be temporarily opened, e.g., for a duration, to direct fuel vapors from the fuel tank 120 to canister 22. By opening the FTIV during refueling conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows FTIV 152 positioned along conduit 178, in alternate embodiments, the FTIV may be mounted on fuel tank 120.

Fuel system 140 may include an additional and optional pressure sensor 191 coupled to the fuel tank for providing an estimate of a fuel system pressure. In one example, the fuel system pressure is a fuel tank pressure, wherein pressure sensor 191 is a fuel tank pressure sensor coupled to fuel tank 120 for estimating a fuel tank pressure or vacuum level. While the depicted example shows pressure sensor 191 directly coupled to fuel tank 120, in alternate embodiments, the pressure sensor may be coupled between the fuel tank and canister 22, specifically between the fuel tank and isolation valve 152.

During a purging operation, fuel vapors released from canister 22 may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. The canister purge valve may be closed during a leak test to isolate the fuel system and the evaporative emissions system. As such, the canister purge valve may be a normally closed valve.

Fuel system 140 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open FTIV 152 while closing canister purge valve (CPV) 112 to direct refueling vapors into canister 22 while blocking fuel vapor flow into the intake manifold. Air stripped of fuel vapors may exit canister 22 and flow through pressure relief valve 76 and air filter 54 via vent line 27 into atmosphere.

As another example, the fuel system may be operated in a refueling mode (e.g., when fuel tank refueling is requested by a vehicle operator), wherein the controller 12 may open FTIV 152, while maintaining CPV 112 closed, to depressurize the fuel tank before allowing fuel to be added therein. As such, FTIV 152 may be kept open during the refueling operation to allow refueling vapors to be stored in the canister. After refueling is completed, the FTIV may be closed. The pressure relief valve 76 enables air flow therethrough during each of refueling mode and fuel vapor storage mode. Further, air exiting the canister 22 may not flow through vacuum relief valve 74 in LDS 75.

As yet another example, the fuel system may be operated in a canister purging mode (e.g., after an emission control device light-off temperature has been attained and with the engine running), wherein the controller 12 may open CPV 112 while closing FTIV 152. Herein, the vacuum generated in the intake manifold of the operating engine may be used to draw fresh air through vent line 27, LDS 75, and through fuel vapor canister 22 to purge the stored fuel vapors from the canister into intake manifold 44. Specifically, fresh air drawn into vent line 27 may flow through vacuum relief valve 74 in LDS 75 and thereon into canister 22. Herein, fresh air may not flow through pressure relief valve 76. In this mode, the purged fuel vapors from the canister are combusted in the engine. The purging may be continued until the stored fuel vapor amount in the canister is below a threshold.

During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 14. Control system 14 includes controller 12, which is shown receiving information from a plurality of sensors 16 (various examples of which are described herein) and sending control signals to a plurality of actuators 81 (various examples of which are described herein). As one example, sensors 16 may include fuel level sensor 134, exhaust gas sensor 126 located in exhaust manifold 48 upstream of the emission control device 70, temperature sensor 128, manifold absolute pressure (MAP) sensor 122, pressure sensor 72, and optional pressure sensor 191. Other sensors such as an ambient temperature sensor, ambient pressure sensors, fuel type sensors, air/fuel ratio, and composition sensors may be coupled to various locations in the vehicle system 6. As another example, the actuators 81 may include fuel injector 66, FTIV 152, CPV 112, fuel pump 21, and throttle 62.

Control system 14 may further receive information regarding the location of the vehicle from an on-board global positioning system (GPS) 17. Information received from the GPS 17 may include vehicle speed, vehicle altitude, vehicle position, etc. This information may be used to infer parameters, such as local barometric pressure, local weather conditions, etc. Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory.

Controller 12 may be configured as a conventional microcomputer including a microprocessor unit, input/output ports, read-only memory, random access memory, keep alive memory, a controller area network (CAN) bus, etc. Controller 12 (also termed electronic controller herein) may be configured as a powertrain control module (PCM). The controller may be shifted between sleep and wake-up modes for additional energy efficiency. During a sleep mode the controller may save energy by shutting down on-board sensors, actuators, auxiliary components, diagnostics, etc. Essential functions, such as clocks and controller and battery maintenance operations may be maintained on during the sleep mode, but may be operated in a reduced power mode. During the sleep mode, the controller will expend less current/voltage/power than during a wake-up mode. During the wake-up mode, the controller may be operated at full power, and components operated by the controller may be operated as dictated by operating conditions. The controller may receive input data from the various sensors, process the input data, and trigger the actuators in response to the processed input data based on instruction or code programmed therein corresponding to one or more routines. An example control routine is described herein with regard to FIGS. 4A and 4B.

The controller 12 receives signals from the various sensors of FIG. 1 and employs the various actuators of FIG. 1 to adjust engine operation based on the received signals and instructions stored on a memory of the controller. For example, opening the CPV 112 of FIG. 1 may include adjusting a solenoid of the CPV. Specifically, the electronic controller may communicate a signal to the solenoid in CPV and activate the solenoid at a desired duty cycle. When activated, the solenoid enables an increase in a degree of opening of the CPV allowing fuel vapors and air to flow therethrough along purge line 28 and into intake manifold 44. When the solenoid is deactivated, the CPV may be closed such that flow of fuel vapors and air therethrough is blocked.

Leak detection routines may be intermittently performed by controller 12 on fuel system 140 and evaporative emissions system 151 to confirm that the systems are not degraded. Degradation of the fuel system and the evaporative emissions system may include a presence of leaks. For example, degradation of the evaporative emissions system may include leaks of vapor. As such, leak detection routines may be performed while the engine is off (engine-off leak test) using engine-off natural vacuum generated due to a change in temperature and pressure at the fuel tank following engine shutdown. Alternatively, leak detection routines may be performed while the engine is running by operating a vacuum pump and/or using engine intake manifold vacuum.

In the depicted embodiment of FIG. 1, integrity of the evaporative emissions system (e.g., absence of vapor leaks) may be inferred based on diurnal temperature variations following a vehicle-off event (including engine-off). Instead of a mechanical switch that closes in response to vacuum in the fuel system reaching a pre-set threshold, LDS 75 includes pressure sensor 72 that monitors pressure (and vacuum) within the evaporative emissions system. Along with a comparator circuit (which will be described further below) and a wake input to the PCM, data from pressure sensor 72 may be utilized to determine integrity and robustness of the evaporative emissions system.

Specifically, at a vehicle-off event (e.g., a key-off event with engine shut down to rest, parked mode of the vehicle, vehicle powered off, vehicle shutdown, etc.) controller 12 may determine a leak test threshold based on data received from various sensors including the on-board GPS. The leak test threshold may be based on ambient conditions such as existing weather, altitude, barometric pressure, ambient temperature, etc. The leak test threshold may also be based upon fuel conditions including fuel temperature, fuel level, fuel type, fuel tank size, etc.

As such, the leak test threshold may be a pressure that the evaporative emissions system may achieve after engine shutdown. Specifically, the leak test threshold may be the expected vacuum generated in the fuel system and evaporative emissions system during cool down after engine-off when robust. The leak test for vapor leaks may include monitoring a pressure (e.g., negative pressure) in the fuel system following vehicle-off via the pressure sensor 72. As the output of the pressure sensor 72 may be in volts, the leak test threshold determined at the vehicle-off event may be converted to volts. The leak test threshold may be converted to a voltage via a look-up table based on a transfer function. The look-up table may be stored in the memory of the controller.

Figure 2:
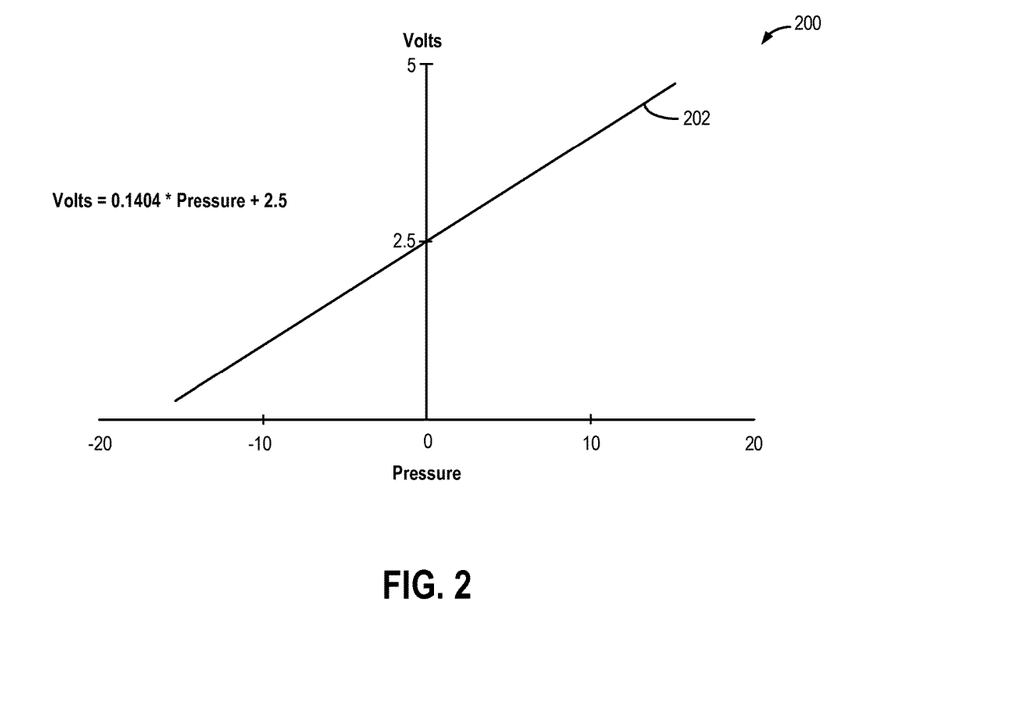
FIG. 2 is a graph depicting an example transfer function for determining a voltage for a vacuum threshold.

An example transfer function is depicted in FIG. 2. Graph 200 includes pressure along the horizontal axis (or x-axis) and volts along the vertical axis (or y-axis). Plot 202 depicts the example transfer function, which can be represented by the following equation:

$$\text{Volts} = 0.1404 * \text{Pressure} + 2.5 \qquad (\text{Eq. 1})$$

For example, if the leak test threshold determined by the controller 12 at the vehicle-off event is −2 inches of water, a value of 2.2 volts may be calculated based on the transfer function (Eq. 1) above. As such, the voltage that the pressure sensor needs to sense for indicating robustness (e.g., lack of degradation) of the evaporative emissions system may be 2.2 V. This voltage of 2.2 V may be applied via a latching chip on a comparator circuit. The latching chip, in one example, may be an 8-bit latching chip. In the above example, the 2.2 V may be programmed into a digital/analog converter which applies the programmed voltage on the comparator circuit.

Upon determining the leak test threshold (in volts) at the vehicle-off event for the upcoming leak test, the controller may sleep while the comparator circuit (e.g., a differential op-amp circuit) is maintained awake. The comparator circuit may receive power from a battery of the vehicle. In one example, the comparator circuit may be a hot at all times (HAAT) comparator circuit.

Once the fuel system is sealed after vehicle-off and fuel in the tank cools down, a vacuum may be generated in the fuel system (including the evaporative emissions system). When the vacuum generated in the fuel and evaporative emissions systems, as sensed by pressure sensor 72 in volts, reaches the leak test threshold, the controller may be woken to indicate that the evaporative emissions system is robust. Specifically, the evaporative emissions system (and fuel system) may be free of vapor leaks. It will be noted that the leak test described in the present disclosure describes tests for vapor leaks and not fuel leaks. As such, the controller may not be woken if the vacuum in the fuel system and evaporative emissions system does not reach the leak test threshold. Herein, the evaporative emissions system may be degraded and may have a vapor leak.

FIG. 3 schematically shows an example comparator circuit 300 operable to wake a powertrain control module at a time following a vehicle-off condition where the evaporative emissions system pressure, as sensed by the pressure sensor, and the leak test threshold determined at vehicle-off are equal. For example, comparator circuit 300 may include powertrain control module (PCM) 305. PCM 305 may be included in a vehicle, such as vehicle 6, as shown in FIG. 1. PCM 305 may activate comparator circuit 300 following a vehicle-off event when a leak test is indicated, and may maintain comparator circuit 300 deactivated following a vehicle-off condition when a vapor leak test is not indicated. In another example, the comparator circuit 300 may be maintained disabled after a vehicle-off event in response to a refueling event. A vehicle-off event may comprise the vehicle being shut down and parked, wherein the engine is also shut down to rest. In a hybrid vehicle, vehicle-off condition may include the vehicle being turned off or deactivated completely. In some examples, vehicle-off may include a key-off event with the vehicle being powered off.

PCM 305 may include wake input 310. Wake input 310 may be coupled to one or more inputs configured to wake up the PCM when the PCM is asleep following a vehicle-off condition. In response to the vapor leak test being indicated, the PCM may determine a vacuum threshold (e.g., the leak test threshold) at the vehicle-off event before entering a sleep mode. During the sleep mode, the PCM may save energy by shutting down on-board sensors, actuators, auxiliary components, diagnostics, etc. Essential functions, such as clocks and PCM and battery maintenance operations may be maintained active during the sleep mode, but may be operated in a reduced power mode. During the sleep mode, the PCM may expend less current/voltage/power than during an awake mode. During the awake (or wake-up) mode, the PCM may be operated at full power, and components regulated by the PCM may be operated as dictated by engine and vehicle operating conditions.

Wake input 310 may be coupled to circuits that indicate a door-ajar condition, a brake pedal depressed condition, etc. Upon a waking in response to the door being opened or the brake pedal being pressed, the PCM may initiate fuel rail priming, and/or other strategies that may reduce crank variability. Wake input 310 may also be configured to trigger PCM 305 to wake up when a signal is received indicating that vacuum in the evaporative emissions system is equal to the vacuum threshold determined at the preceding vehicle-off event. Wake input 310 may be coupled to op-amp 320. Op-amp 320 may comprise a first input 312, a second input 314, and an output 316. In the depicted example, first input 312 is configured as a positive input and second input 314 is configured as a negative input. In other examples, these configurations may be reversed. In still other examples, the first and second inputs may have equivalent configurations. Thus, in the depicted configuration, the output 316 of the comparator circuit 300 may be a difference between the first input 312 and second input 314.

In this configuration, wake input 310 is configured to wake PCM 305 when a zero signal is received from output 316. Op-amp 320 is configured to output a zero signal via output 316 when the value of a voltage at first input 312 is equal to the value of a voltage at second input 314. First input 312 is coupled to pressure sensor 302 (e.g., same as pressure sensor 72 of FIG. 1), and configured to receive a signal proportionate to the vacuum (or positive pressure) in the evaporative emissions system. The signal from the pressure sensor may be processed e.g., band pass filtered, via filter 306 before being communicated to op-amp 320. In one example, filter 306 may be a low pass filter. Second input 314 is coupled to digital/analog output 318 from PCM 305 via latching chip 308. As such, once the PCM determines the vacuum threshold at the vehicle-off event based on existing ambient and fuel conditions, the vacuum threshold is converted to a voltage reading (as described in reference to FIG. 2) and the voltage reading is latched via latching chip 308. The PCM 305 may sleep after the latching chip latches the voltage reading. Thus, comparator circuit 300 may compare actual pressure of the evaporative emissions system as sensed by the pressure sensor to an estimated pressure (e.g., the vacuum threshold) to determine the presence or absence of evaporative emissions system degradation.

As the output 316 of the comparator circuit 300 is a difference between an output of the pressure sensor and the latched voltage (or leak test threshold), the op-amp 320 may provide a zero signal as output 316 when vacuum within the evaporative emissions system reaches the vacuum threshold determined at vehicle-off. Said another way, when the reading from the pressure sensor received as a voltage at first input 312 is equivalent to the latched voltage (based on the vacuum threshold) provided as second input 314, the output 316 may be zero voltage. As mentioned above, the zero voltage signal from output 316 when conveyed to the wake input 310 may awaken PCM 305 from its sleep mode. The PCM 305 may awaken to indicate absence of a leak (e.g., vapor leak) in the evaporative emissions system as the fuel system and evaporative emissions system develop a level of vacuum equivalent to the vacuum threshold.

Comparator circuit 300 may be configured as a hot-at-all-times circuit. As such, comparator circuit 300 may be a differential op-amp circuit. Comparator circuit 300 may receive power from voltage source 328. Voltage source 328 may be a battery or other energy storage device and may be coupled to the comparator circuit via pull-up resistor 340.

In this manner, a leak test for vapor leaks based on diurnal cycles may be more flexible as it incorporates variations in vehicle location, current weather conditions, and fuel conditions. The electronic controller or PCM may calculate a leak test threshold (or the vacuum threshold) based on factors that may affect a level of vacuum build in the fuel system and evaporative emissions system after vehicle-off. This calculated leak test threshold may be stored in the PCM via a latching chip and the PCM may sleep while the comparator circuit is maintained active and awake. The pressure sensor in the LDS may monitor the change in pressure (e.g., the vacuum increase) in the evaporative emissions system as fuel in (and other components of) the fuel system cools down after vehicle-off. Once the vacuum in the evaporative emissions system reaches the vacuum threshold, the comparator circuit may wake up the PCM to indicate that no leak is present in the evaporative emissions system. If the vacuum build in the evaporative emissions system does not reach the vacuum threshold, the PCM remains asleep until woken up by a subsequent vehicle-on condition. Herein, the evaporative emissions system may be determined to be degraded as vacuum in the evaporative emissions system does not reach the vacuum threshold (due to leaks in the system). Further details will be elaborated in reference to routine 400 of FIGS. 4A and 4B below.

Turning to FIGS. 4A and 4B, they depict example routine 400 for conducting a vehicle-off (or engine-off) leak test based on the diurnal cycle. Specifically, the leak test may be based on a leak test threshold that is determined responsive to the vehicle being deactivated every time the leak test is desired. Routine 400 will be described in relation to the system shown in FIG. 1 but it should be understood that similar routines may be used with other systems without departing from the scope of this disclosure. Instructions for carrying out routine 400 included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system, such as the actuators of FIG. 1 to adjust engine operation and vehicle operation, according to the routines described below.

At 402, existing engine and vehicle conditions may be evaluated. Existing engine and vehicle conditions may be measured, estimated or inferred. For example, existing engine conditions may include engine load, engine speed (Ne), air-fuel ratio, etc. As such, fuel delivered to the engine may be controlled by a controller (such as controller 12) based on engine operating conditions including engine speed, engine load, air-fuel ratio, etc. In addition, the routine may also estimate existing fuel fill level in the fuel tank. Further, the routine may also monitor existing weather conditions including ambient temperature, barometric pressure (or existing atmospheric pressure), humidity, etc. For example, the on-board GPS may be utilized for determining vehicle altitude, vehicle location, and current weather at vehicle location.

Next, at 404, routine 400 determines whether a vapor leak test is indicated for the next vehicle-off condition. The leak test may be a vehicle-off leak test (or an engine-off leak test). Determining whether an evaporative emission leak test is indicated may include retrieving a flag set in the PCM, running an algorithm, retrieving previous evaporative emission leak test data, etc. For example, the vapor leak test may be performed periodically, such as every 100 miles driven. Herein, the leak test may be indicated if a threshold distance and/or threshold duration since a previous leak test is exceeded. If no leak test is indicated, routine 400 proceeds to 410 to maintain existing engine and vehicle operation. As such, existing fuel system and evaporative emissions system status may also be maintained. Routine 400 may then end.

If a leak test is indicated, routine 400 continues to 406 to determine whether a vehicle-off event is detected. A vehicle-off condition may include a key-off condition, an engine-off event, a vehicle shutdown event or other indication that the vehicle is no longer being operated. If the vehicle-off condition is not detected, routine 400 proceeds to 408 to not initiate the engine-off leak test. At 408, routine 400 may also include setting a flag to retry the vehicle-off vapor leak test at the next detected engine-off or vehicle-off event. Further, routine 400 continues to 410 to maintain existing engine and vehicle operating conditions. As such, existing conditions may be maintained until the vehicle is shut down, and then the leak test may be initiated. If, however, a vehicle-off condition is detected, routine 400 progresses to 412 to confirm if the vehicle-off event is in response to a refueling event. A refueling event may be an operator requested event and may be confirmed by one of the operator depressing a button, a refueling lock being unlocked, and an increase in fuel fill in the fuel tank, the increase being greater than a threshold. If the vehicle-off conditions is in response to the refueling event, routine 400 continues to 414 to not initiate the vapor leak test. As such, a duration of the refueling event may be insufficient for conducting the leak test. Accordingly, at 416 the controller does not determine a leak test threshold in response to the vehicle-off event. Further, the PCM (or the controller) may not sleep during the refueling event. In other words, a sleep mode of the PCM may not be enabled. Routine 400 then ends.

Conversely, if the vehicle-off condition is not in response to a refueling event, routine 400 proceeds to 418 to determine a leak test threshold (LTT). The leak test threshold may also be termed vacuum threshold. As such, the vapor leak test may be initiated following vehicle-off. Although entry conditions, such as the vehicle-off event and absence of refueling event, may be met at the beginning of routine 400, this may change during the execution of the routine. For example, an engine restart or refueling event may be sufficient to abort the leak test at any point prior to completing routine 400. If such events are detected that would interfere with the performing of routine 400 or the interpretation of results derived from executing routine 400, routine 400 may record that a vehicle-off vapor leak test was aborted, and set a flag to retry the vapor leak test at the next detected vehicle-off or engine-off event, and then end.

The vacuum threshold may be a pressure (e.g., negative pressure) that the evaporative emissions system would achieve after the engine shutdown based on ambient conditions and fuel conditions when robust. Herein, the leak test threshold may be determined before turning off the controller after shutdown of the engine. The vacuum threshold determined by the PCM may be converted to volts via the transfer function as explained in reference to FIG. 2 and may be stored on a latching chip. The latched voltage may be applied on the comparator circuit via the latching chip. As such, with reference to FIG. 3, the latched voltage representing the vacuum threshold may be the second input 314 into op-amp 320 of comparator circuit 300.

At 420, the vacuum threshold is determined based on existing ambient conditions and existing fuel conditions. As such the leak test threshold may be estimated by the electronic controller based on existing ambient conditions and existing fuel conditions. In other words, the leak test threshold may be estimated each time a vehicle-off leak test is desired and a subsequent vehicle-off event occurs. It will be noted that the leak test threshold may not be a fixed threshold over a lifetime of vehicle operation. It will also be noted that the vacuum threshold may not be a single, constant value set on bench or for example, determined prior to vehicle delivery to a dealership.

As an example, the leak test threshold may be determined based on fuel type (e.g., ethanol content, fuel volatility), fuel tank size, fuel fill in the fuel tank, etc. In one example, if the fuel tank is larger than a threshold size, the leak test threshold may be reduced. In other words, for a vehicle with a larger fuel tank (e.g., volume higher than 40 gallons), the vacuum threshold may be lower (e.g., closer to atmospheric pressure) as vacuum build due to fuel cooling may be slower. As another example, the leak test threshold may also be determined based on ambient conditions including weather at vehicle location. For example, during windy conditions, the leak test threshold may be set to a higher vacuum level as the weather conditions may enable faster build-up of vacuum. In another example, the vacuum threshold may be based on ambient temperature, ambient pressure (e.g., barometric pressure), etc.

Returning to routine 400, at 422 vehicle systems are shut down (e.g., deactivated) while maintaining the PCM awake. Shutting down vehicle systems may include shutting down engine systems, fuel system components, or other vehicle systems and components that are not necessary for vehicle maintenance during the vehicle-off condition. As the leak test is based on the development of a fuel tank vacuum due to fuel cooling following engine shutdown to rest, the fuel system and the evaporative emissions system are also sealed at 422. For example, the canister purge valve may be closed, if open, by deactivating the solenoid within the canister purge valve. A vacuum may be generated in the fuel tank as the bulk fuel cools down after the vehicle-off event.

Next, at 424, the comparator circuit is engaged while enabling a sleep mode of the PCM. It will be noted that the sleep mode of the electronic controller or PCM is enabled only after the electronic controller determines the vacuum threshold at vehicle-off (at 418) and shuts down vehicle systems at 422. The sleep mode of the PCM may also be termed turning off the PCM (or controller) while the comparator circuit is maintained awake. Engaging the comparator circuit may include drawing power from a voltage source, such as the vehicle battery. Power may also be supplied to each of pressure sensor 72 of the LDS 75 in FIG. 1, an op-amp, and other comparator circuit components such as latching chip and resistors. The comparator circuit may thus be activated while the PCM is sleeping. The comparator circuit may provide an output to the PCM wake input continuously, at regular intervals, or when a change in voltage output is determined (e.g., if a new output voltage is different from a previous output voltage).

At 426, routine 400 includes monitoring output from the pressure sensor (PT_O) coupled in the LDS. The pressure sensor may provide output related to pressure changes in the fuel system and evaporative emissions system. With reference to FIG. 3, the output from the pressure sensor may be received as first input 312 in the op-amp 320 of comparator circuit 300. The comparator circuit continuously compares the first input, or pressure sensor output PT_O, to the second input, the vacuum threshold.

Continuing at 428, routine 400 includes determining whether the comparator circuit indicates that the vacuum level in the evaporative emissions system is equal to (and/or within a range of) the vacuum threshold. Specifically, routine 400 determines if the comparator circuit indicates that PT_O is equal to the LTT determined at 418. For example, utilizing comparator circuit 300, op-amp 320 may output a signal equal to zero when the pressure (e.g., negative pressure) in the evaporative emissions system and leak test threshold are equal. Alternatively, if the vacuum in the evaporative emissions system is within a range, e.g., 5%, of the vacuum threshold, the comparator circuit may yet output a zero voltage.

If the vacuum generated in the evaporative emissions system during fuel cooling is not equal to the vacuum threshold, routine 400 proceeds to 430 to maintain the PCM asleep. Further, routine 400 also includes maintaining the comparator circuit active at 432. As such, the PCM may be maintained asleep until either the comparator circuit indicates that PT_O is equal to the LTT or until the next vehicle-on event. Likewise, the comparator circuit may be maintained active until the output of the comparator circuit is zero or until the next vehicle-on event. If the vacuum threshold is not attained and the PCM is not woken up during the vehicle-off leak test by the comparator circuit, an evaporative emissions system vapor leak may be likely. Routine 400 then continues to 440.

If, however, the vacuum in the evaporative emissions system as measured by the output of the pressure sensor (PT_O) is equal to the leak test threshold, routine 400 continues to 434. As such, if a level of vacuum generated due to fuel cooling is equivalent to the vacuum threshold determined at 418, the evaporative emissions system may be robust and vapor leaks may be absent. At 434, routine 400 includes waking the PCM. Specifically, the zero signal from the output of the op-amp in the comparator circuit provided to the wake input of the PCM may awaken the PCM. As the vacuum threshold is reached following the vehicle-off event, the evaporative emissions system is declared robust via indicating at 436 that leaks are absent in the evaporative emissions system. As such, the vapor leak test may be considered a "pass". Next, at 438, the PCM may return to the sleep mode after indicating that no vapor leaks are present in the evaporative emissions system. As such, the PCM may now sleep until the next vehicle-on event. The PCM may enter leak test data into a memory of the controller, unseal the fuel and evaporative emissions systems, and deactivate the comparator circuit before sleeping at 438.

At 440, routine 400 determines if a vehicle-on event has occurred. The vehicle-on event may include one or more of a key-fob being inserted into a specific socket, a key-on condition, an engine-on condition wherein the engine is activated and combusting, depressing a brake pedal, etc. If no, routine 400 continues to 442 to maintain existing status of the system. For example, if the PCM is sleeping, the PCM may continue in the sleep mode. On the other hand, if the vehicle-on event is confirmed, routine 400 continues to 444 to wake up the PCM. Next, at 446, routine 400 determines if the last time the PCM was awakened was when the comparator circuit provided a zero signal to the wake input of the PCM. Specifically, it may be determined if the PCM was most recently awakened in response to the comparator circuit indicating that the pressure sensor output was equal to the leak test threshold. In other words, routine 400 confirms that the PCM was previously awakened to indicate absence of a leak in the evaporative emissions system (or to indicate that the evaporative emissions system is robust). If yes, routine 400 proceeds to 448 to continue operation of the PCM and the vehicle as desired. Since the evaporative emissions system has been determined to be robust, vehicle operation may continue as desired. Further, if not performed at 436, leak test data may be entered into the memory of the controller. Routine 400 then ends.

If the PCM was not awakened because the comparator circuit did not output a zero signal during the preceding vehicle-off duration, routine 400 continues to 450 to determine that the PCM was last awake at the previous vehicle-off event. As such, vacuum in the evaporative emissions system may not have reached the vacuum threshold during the vehicle-off duration and the PCM may have been in the sleep mode from 424 to 444.

Next, at 452, routine 400 determines if ambient temperature decreased during the vehicle-off event (and when PCM was asleep) by at least a threshold, $\Delta TA$. The threshold $\Delta TA$ may also be termed a threshold decrease. In other words, routine 400 determines if a decrease in ambient temperature during the vapor leak test is higher than or equal to the threshold, $\Delta TA$. As such, the routine may confirm if sufficient diurnal cooling occurred during the vapor leak test. In one example, $\Delta TA$ may be 8 degrees Celsius. In another example, $\Delta TA$ may be 10 degrees Celsius. Other examples of $\Delta TA$ may be contemplated without departing from the scope of this disclosure. In one example, the PCM may be awakened (from the sleep mode) repetitively to determine the change in ambient temperature. As an example, the PCM may be wakened at regular intervals, e.g. once every 30 minutes, to track ambient temperature and store the readings. Herein, the PCM may be wakened for short durations, e.g. few seconds, to determine the ambient temperature. In another example, the PCM may query an information cloud on wake-up (such as at 444) for historical weather data to determine if the threshold decrease in ambient temperature was observed.

If it is determined that the ambient temperature did not decrease by at least $\Delta TA$, routine 400 continues to 458 to indicate that the vapor leak test is inconclusive. As such, without sufficient diurnal cooling during the vapor leak test (e.g., between vehicle-off at 406 and subsequent vehicle-on at 440), adequate vacuum may not build in the evaporative emissions system. Data from the vapor leak test may be discarded and the controller may note that the vapor leak test is to be repeated. Further, the controller may neither indicate that the evaporative emissions system is robust nor that the evaporative emissions system is degraded.

On the other hand, if it is confirmed that the ambient temperature decreased during the vehicle-off event and the decrease in ambient temperature was higher than or equivalent to the threshold $\Delta TA$, routine 400 progresses to 454. At 454, routine 400 includes indicating degradation of the evaporative emissions system. Specifically, the controller may indicate that vapor leaks may be present in the evaporative emissions system. Said another way, the controller may indicate degradation of the evaporative emissions system based on each of the leak test having executed during the vehicle-off duration, the decrease in ambient temperature being higher than the threshold, and responsive to vacuum in the evaporative emissions system during vehicle-off not attaining the vacuum threshold. Further, at 456, routine 400 sets a diagnostic trouble code (DTC) and may light a malfunction indicator lamp (MIL). Routine 400 then ends.

It will be noted that routine 400 may additionally or alternatively determine if the vapor leak test (e.g., the vehicle-off event with PCM asleep after determining the LTT) lasted for a threshold duration. For example, the threshold duration may be 2 hours. In another example, the threshold duration may be 3 hours. Shorter or longer threshold durations may be used in alternative embodiments. The controller may thus confirm that the vapor leak test had ample time to traverse a cooling portion of the diurnal temperature cycle. Further still, the controller may indicate degradation of the evaporative emissions system responsive to each of the vacuum threshold (LTT) not being attained during the vehicle-off event, the vehicle-off event having a duration greater than the threshold duration, and sufficient diurnal cooling (e.g., decrease in ambient temperature being greater than or equal to the threshold decrease) being observed.

Thus, the vapor leak test as performed in routine 400 may be more reliable as the leak test does not rely on a single constant vacuum threshold value for passing the leak test. Further, the leak test threshold may be varied based on different weather conditions, vehicle locations, and fuel conditions allowing for a reduction in false fails and false passes of the leak test. As such, the vacuum threshold may be considered a variable threshold since the leak test threshold can change every time the leak test is initiated at a vehicle-off event. The present disclosure utilizes a pressure sensor (instead of a mechanical switch) in the leak detection system and a comparator circuit to wake up the electronic controller if the leak test is a pass (or the fuel system is robust). If the electronic controller is not awakened by the comparator circuit during the vehicle-off leak test, the evaporative emissions system may be degraded.

Figure 5:
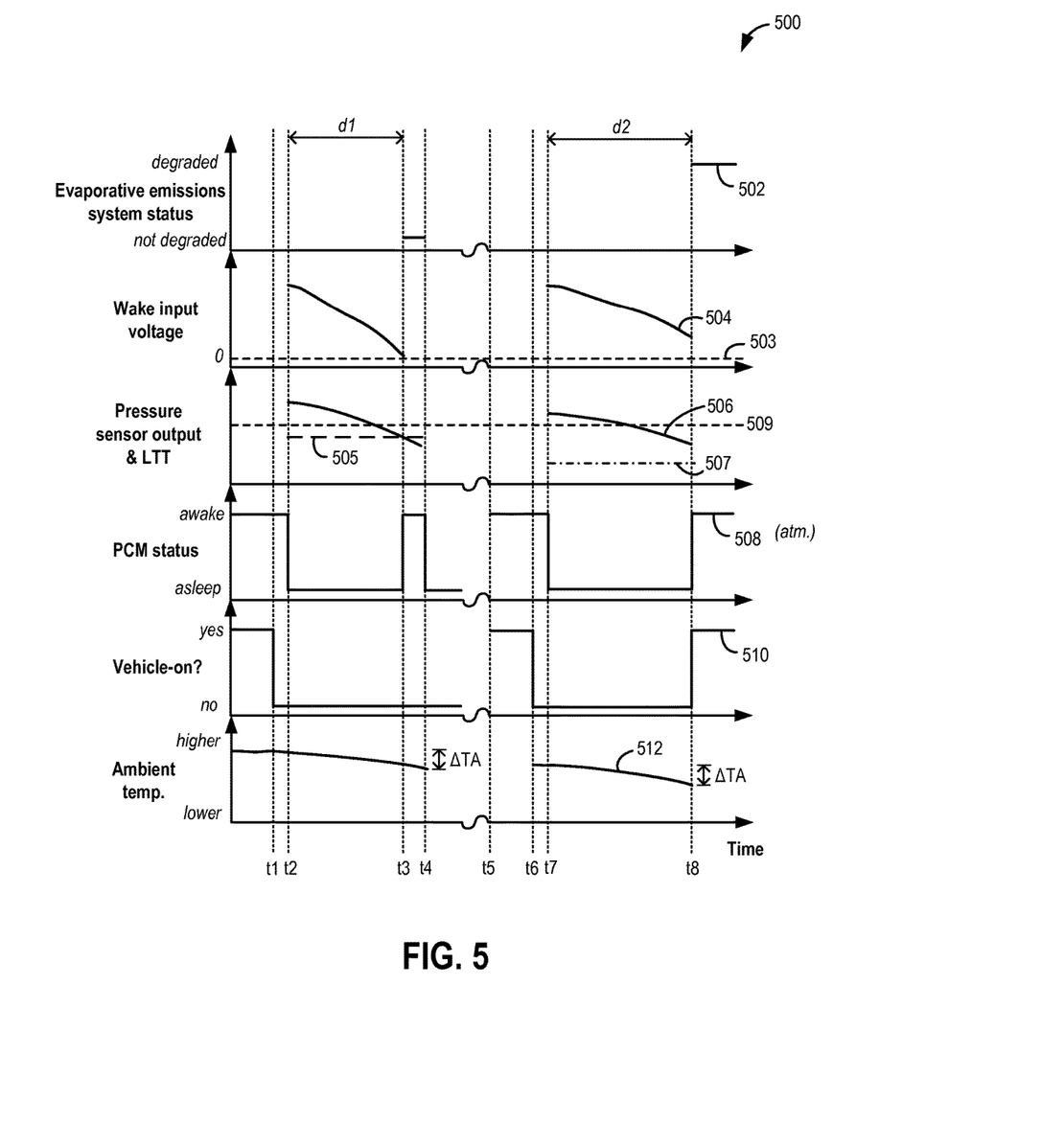
FIG. 5 shows an example timeline for an evaporative emissions leak test based on the flow chart of FIGS. 4A and 4B.

Turning now to FIG. 5, an example map 500 is shown illustrating leak tests in a vehicle, such as the vehicle system 6 of FIG. 1, the leak tests based on routine 400 of FIGS. 4A and 4B. As such, map 500 will be described in relation to the system shown in FIG. 1. Map 500 depicts evaporative emissions system status at plot 502, voltage at the PCM wake input at plot 504, output of the pressure sensor at plot 506, status of the PCM at plot 508, a vehicle-on status at plot 510, and ambient temperature at plot 512. Line 503 represents a threshold voltage (e.g., zero voltage) for waking the PCM while a first leak test threshold or vacuum threshold is represented by line 505 (long dashes) and a second leak test threshold is represented by line 507 (dash-dot line). Further, line 509 represents atmospheric pressure or barometric pressure. The evaporative emissions system status may be either degraded or not degraded while the PCM status may be one of awake (wake mode) and asleep (or sleep mode). All plots are shown over time, along the x-axis. Further, time increases from the left of the x-axis towards the right. Note that elements aligning at a common time on the graph, such as at time t1, for example, are occurring concurrently.

Prior to t1, the vehicle may be "ON" and operating, as shown by plot 510. In one example, the vehicle-on status may indicate the engine within the vehicle is combusting and propelling the vehicle. In another example, the vehicle may be "ON" when it is idling. In yet another example, a motor (if a hybrid vehicle) may be operating with energy sourced from an energy storage device to propel the hybrid vehicle. Prior to t1, the PCM may also be awake as shown by plot 508. Further, ambient temperature may be higher.

At t1, the vehicle is deactivated and turned "OFF". For example, the engine may be shut down to rest and the vehicle may be powered off. Further, though not shown, a vehicle-off leak test may be indicated. Accordingly, the PCM is maintained awake between t1 and t2 and determines a first leak test threshold (LTT), depicted by dashed line 505 between t2 and t4. The LTT may be based on existing ambient conditions and fuel conditions at t1. Upon determining the LTT, vehicle systems may be shut down and the fuel system and evaporative emissions system may be sealed. At t2, the PCM sleep mode is enabled after the LTT is determined and the PCM may sleep. However, the comparator circuit may be activated and maintained active (not shown) for the leak test. Further, pressure sensor output may be monitored from t2 onwards for determining integrity of the evaporative emissions system.

As the bulk fuel in the fuel tank (and other fuel system components) may be warmed due to heat rejection from a combusting engine prior to the vehicle-off, pressure in the fuel system (and evaporative emissions system) may be positive (e.g., higher than atmospheric pressure represented by line 509). Further, pressure sensor output may be higher than the vacuum threshold (first LTT as depicted by line 505) at t2. Accordingly, a voltage applied to the wake input of the PCM (plot 504) is above the threshold voltage represented by line 503. As the bulk fuel cools during the vehicle-off, pressure in the evaporative emissions system and pressure sensor output reduces (plot 506) between t2 and t3. Specifically, between t2 and t3, pressure in the evaporative emissions system becomes negative as it drops below atmospheric pressure. In response to the decrease in pressure sensor output, the wake input voltage also decreases between t2 and t3.

While the wake input voltage is above the threshold voltage, the PCM is maintained asleep. At t3, the pressure sensor output is within a range of the first leak test threshold (line 505). Specifically, the pressure sensor output reaches the first leak test threshold at t3. Accordingly, the wake input voltage also reaches the threshold voltage (e.g., zero voltage) represented by line 503. In response to the zero signal at the wake input, the PCM is woken up at t3 to indicate a lack of degradation of the evaporative emissions system (plot 502). Further, after indicating the absence of vapor leaks in the evaporative emissions system, the PCM returns to the sleep mode at t4 while the vehicle remains off. It will be noted that the duration of the vapor leak test is duration d1 between t2 and t3. It will also be noted that ambient temperature decreases by the threshold amount ΔTA in the duration d1 of the vapor leak test. As such, the vapor leak test may include sufficient diurnal cooling.

Between t4 and t5, a duration of time may pass and multiple engine and drive cycles may occur. In other words, the vehicle may be operated until the next vapor leak test is indicated based on a threshold duration since the previous leak test. At t5, the vehicle may be "ON" and operational while the PCM is also awake. At t6, a vehicle-off event may occur and since a vehicle-off leak test is desired, the PCM may stay awake between t6 and t7 to determine a leak test threshold (e.g. second LTT as represented by dash-dot line 507) based on existing ambient and fuel conditions.

As such, the leak test threshold (e.g., the second LTT shown by line 507) determined by the electronic controller at t7 is lower than the first leak test threshold between t1 and t4 (line 505). For example, the ambient and/or fuel conditions at the vehicle-off event at t6 may be distinct and dissimilar from ambient and/or fuel conditions during vehicle-off at t1. Accordingly, the vacuum threshold for the vehicle-off leak test between t7 and t8 may be different from that for the leak test between t2 and t4. To elaborate, the vacuum threshold between t2 and t4 may be a lower amount of vacuum compared to the vacuum threshold between t7 and t8. Said another way, the vacuum threshold between t7 and t8 (line 507) may represent a higher amount of vacuum compared to the amount of vacuum represented by vacuum threshold between t2 and t4 (line 505).

Once the vacuum threshold is determined, the PCM sleeps at t7. However, the comparator circuit is kept activated while the vehicle is powered off and the PCM is asleep. Further, the pressure in the evaporative emissions system is monitored by the pressure sensor. Between t7 and t8, the pressure in the evaporative emissions system decreases from above atmospheric pressure to below atmospheric pressure (line 509) but does not reach the vacuum threshold in the duration d2 between t7 and t8. Concurrently with the change in pressure sensor output, the wake input voltage also decreases but does not reach the threshold voltage (line 503) in the duration d2. Accordingly, the PCM remains asleep. As such, duration d2 may be longer than duration d1 between t2 and t4. However, duration d2 may be the same duration as duration d1 in alternative embodiments. It will be noted that ambient temperature decreases by the threshold amount $\Delta TA$ in the duration d2 of the vapor leak test.

At t8, the vehicle is powered on (e.g., by an operator) and the PCM is awakened in response to vehicle-on. At t8, when the PCM is awake, it may indicate that the evaporative emissions system is degraded (plot 502) based on an evaluation that the last time the PCM was awake was at the preceding vehicle-off at t6. Further, the evaporative emissions system may be considered degraded based on the evaluation that a vehicle-off vapor leak test was performed between t7 and t8 and the PCM was not woken up by the comparator circuit. Further still, the diurnal cooling in the duration d2 of the vapor leak test may be sufficient to confirm the presence of leaks. Thus, the electronic controller is woken up at a vehicle-on subsequent to the vehicle-off at t6 and indicates a presence of a vapor leak in the evaporative emissions system responsive to vacuum in the evaporative emissions system (and fuel system) not reaching the vacuum threshold and a decrease in ambient temperature greater than or equal to a threshold (e.g., $\Delta TA$).

Thus, in an example representation, an example method may comprise responsive to a vehicle-off event, determining a leak test threshold with an electronic controller, enabling a sleep mode of the electronic controller, and responsive to a first condition, waking the electronic controller to indicate an absence of a leak in an evaporative emissions system of the vehicle, and responsive to a second condition, not waking the electronic controller until a subsequent vehicle-on event. In the preceding example, the first condition may additionally or optionally include a pressure in the evaporative emissions system reaching the leak test threshold (e.g., between t2 and t3 of map 500), and the second condition may additionally or optionally include the pressure in the evaporative emissions system not reaching the leak test threshold (such as between t7 and t8 in map 500). In any or all of the preceding examples, the leak test threshold may additionally or optionally be determined based on ambient conditions and fuel conditions at the vehicle-off event. In any or all of the preceding examples, the method may additionally or optionally comprise, during the second condition, indicating degradation of the evaporative emissions system, the indicating performed by the electronic controller upon waking up at the subsequent vehicle-on event. As shown at t8, the controller may indicate degradation of the evaporative emissions system upon waking up due to the vehicle-on event at t8. The indication of degradation may be based upon the PCM not being woken up and the vehicle-off leak test having executed with sufficient diurnal cooling during the vehicle-off between t6 and t8. Accordingly, in any or all of the preceding examples, the controller may indicate degradation of the evaporative emissions system Another example method may comprise following a vehicle-off event, waking an electronic controller to indicate an absence of a leak in an evaporative emissions system responsive to vacuum in the evaporative emissions system attaining a vacuum threshold, the vacuum threshold determined at the vehicle-off event by the electronic controller and the vacuum threshold based on ambient conditions and fuel conditions. In the preceding example, the method may additionally or optionally comprise sealing the evaporative emissions system following the vehicle-off event and determining of the vacuum threshold. In any or all of the preceding examples, the electronic controller may additionally or optionally sleep after determining the vacuum threshold. In any or all of the preceding examples, the method may additionally or optionally comprise enabling a sleep mode of the electronic controller after indicating the absence of the leak. In any or all of the preceding examples, the ambient conditions may additionally or optionally include one or more of ambient temperature, ambient pressure, and ambient humidity, and wherein fuel conditions include one or more of fuel level, fuel volatility, and fuel type. In any or all of the preceding examples, the method may additionally or optionally comprise maintaining a comparator circuit awake following the vehicle-off event. In any or all of the preceding examples, the comparator circuit may additionally or optionally yield a voltage based on a comparison of the vacuum threshold and an output of a pressure sensor. In any or all of the preceding examples, the comparator circuit may additionally or optionally provide an output of zero voltage when the output of the pressure sensor is equal to the vacuum threshold, and wherein the output of zero voltage may additionally or optionally wake up the electronic controller. In any or all of the preceding examples, the method may additionally or optionally comprise waking the electronic controller at a subsequent vehicle-on to indicate a presence of the leak responsive to vacuum in the evaporative emissions system not reaching the vacuum threshold. In any or all of the preceding examples, the electronic controller may indicate the presence of the leak responsive to vacuum in the evaporative emissions system not reaching the vacuum threshold and a decrease in ambient temperature that is higher than a threshold. In any or all of the preceding examples, the electronic controller may indicate the presence of the leak responsive to each of vacuum in the evaporative emissions system not reaching the vacuum threshold, the decrease in ambient temperature being higher than the threshold, and duration of vehicle-off (e.g., vapor leak test) greater than a threshold duration. In any or all of the preceding examples, the vacuum threshold may additionally or optionally not be determined by the electronic controller, and a leak test may additionally or optionally not be initiated if the vehicle-off event is in response to a refueling event.

An example system for a vehicle may comprise a fuel system including a fuel tank, an evaporative emissions system coupled to the fuel system, a pressure sensor coupled to each of the evaporative emissions system and the fuel system, the pressure sensor measuring a pressure in the evaporative emissions system and fuel system, a powertrain control module comprising a wake input, and a comparator circuit coupled to the wake input, the powertrain control module configured with instructions stored in non-transitory memory that when executed cause the powertrain control module to, in response to a vehicle-off event, estimate a vacuum threshold based on each of ambient conditions and fuel conditions, sleep following estimating the vacuum threshold while maintaining the comparator circuit awake, and responsive to vacuum in the evaporative emissions system reaching the vacuum threshold, wake up and indicate a robust evaporative emissions system, and sleep following the indication. In the preceding example system, the comparator circuit may additionally or optionally comprise an op-amp comprising a first input, a second input, and an output coupled to the wake input, the first input being a reading from the pressure sensor, the second input being the vacuum threshold determined in response to the vehicle-off event, and the output being a voltage based on a difference between the first input and the second input. In any or all of the preceding examples, the powertrain control module may additionally or optionally be further configured to sleep without waking until a voltage at the wake input attains a threshold. In any or all of the preceding examples, the comparator circuit may additionally or optionally output a zero voltage (or a zero signal) to the wake input when the reading from the pressure sensor reaches the vacuum threshold. In any or all of the preceding examples, the powertrain control module may be additionally or optionally configured to, responsive to vacuum in the evaporative emissions system not reaching the vacuum threshold, not wake up until a subsequent vehicle-on. Further, in any or all of the preceding examples, the powertrain control module may be additionally or optionally configured to, upon waking up at the subsequent vehicle-on, determine a degraded evaporative emissions system responsive to each of the vacuum in the evaporative emissions system not reaching the vacuum threshold and a decrease in ambient temperature greater than a threshold decrease. In any or all of the preceding examples, the system may additionally or optionally comprise a voltage source coupled to the comparator circuit, the voltage source configured to maintain the comparator circuit awake while the powertrain control module sleeps.

In yet another example, an example method may comprise controlling fuel delivered to an engine by a controller, before turning off the controller after shutdown of the engine, estimating pressure an evaporative emissions system would achieve after the shutdown based on ambient conditions and fuel conditions, and determining whether a vapor leak exists in the evaporative emissions system after the controller turnoff in response to a comparison of actual pressure of the evaporative emissions system to the estimated pressure. In the preceding example, the method may additionally or optionally comprise indicating an absence of the vapor leak in response to the actual pressure (e.g., output from the pressure sensor) being equal to the estimated pressure (e.g., leak test threshold). In any or all of the preceding examples, the controller may be additionally or optionally awakened from turnoff in response to the actual pressure being equal to the estimated pressure, and wherein the controller may additionally or optionally indicate the absence of the vapor leak. In any or all of the preceding examples, the method may additionally or optionally comprise indicating the vapor leak responsive to the actual pressure not attaining the estimated pressure and a decrease in ambient temperature greater than a threshold decrease after the controller turnoff. In any or all of the preceding examples, the fuel delivered to the engine may be additionally or optionally controlled based on one or more of an engine load, an engine speed, and an air-fuel ratio, and wherein the shutdown of the engine may additionally or optionally include shutting down the engine to rest.

In this way, a vehicle-off vapor leak test may provide more reliable and accurate results. The leak test may include a leak test threshold that is determined based on existing ambient conditions and fuel conditions. Thus, the leak test threshold may be a different threshold for every vehicle-off leak test in the given vehicle. A technical effect of determining the leak test threshold based on ambient and fuel conditions is that the vapor leak test may not rely on factors that affect a build-up of vacuum in the evaporative emissions system after vehicle-off. Further, as the leak test threshold varies with every leak test, a pressure sensor may be utilized to monitor the changes in the evaporative emissions system pressure after vehicle off and determine if the pressure in the evaporative emissions system reaches the leak test threshold. As the PCM is put to sleep during the vapor leak test, battery charge usage may be reduced. Furthermore, by enabling a more accurate leak test, vehicle emissions compliance may be enhanced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
following a vehicle-off event, waking an electronic controller to indicate an absence of a vapor leak in an evaporative emissions system responsive to vacuum in the evaporative emissions system attaining a vacuum threshold, the vacuum threshold determined at the vehicle-off event by the electronic controller and the vacuum threshold based on ambient conditions and fuel conditions, and sleeping the electronic controller after determining the vacuum threshold.

2. The method of claim 1, further comprising sealing the evaporative emissions system following the vehicle-off event and determining of the vacuum threshold.

3. The method of claim 1, further comprising enabling a sleep mode of the electronic controller after indicating the absence of the vapor leak.

4. The method of claim 1, wherein the ambient conditions include one or more of ambient temperature, ambient pressure, and ambient humidity, and wherein the fuel conditions include one or more of fuel level, fuel volatility, and fuel type.

5. The method of claim 1, further comprising maintaining a comparator circuit awake following the vehicle-off event.

6. The method of claim 5, wherein the comparator circuit yields a voltage based on a comparison of the vacuum threshold and an output of a pressure sensor.

7. The method of claim 6, wherein the comparator circuit provides an output of zero voltage when the output of the pressure sensor is equal to the vacuum threshold, and wherein the output of zero voltage wakes up the electronic controller.

8. The method of claim 1, further comprising waking the electronic controller at a subsequent vehicle-on to indicate a presence of the vapor leak responsive to vacuum in the evaporative emissions system not reaching the vacuum threshold.

9. The method of claim 1, wherein the vacuum threshold is not determined by the electronic controller, and a leak test is not initiated if the vehicle-off event is in response to a refueling event.

10. A system for a vehicle, comprising:
a fuel system including a fuel tank;
an evaporative emissions system coupled to the fuel system;
a pressure sensor coupled to the evaporative emissions system and the fuel system, the pressure sensor measuring a pressure in the evaporative emissions system and fuel system;
a powertrain control module comprising a wake input; and
a comparator circuit coupled to the wake input, the powertrain control module configured with instructions stored in non-transitory memory that when executed cause the powertrain control module to:
in response to a vehicle-off event,
estimate a vacuum threshold based on each of ambient conditions and fuel conditions;
sleep following estimating the vacuum threshold while maintaining the comparator circuit awake; and
responsive to vacuum in the evaporative emissions system reaching the vacuum threshold,
wake up and indicate a robust evaporative emissions system; and
sleep following the indication.

11. The system of claim 10, wherein the comparator circuit comprises an op-amp comprising a first input, a second input, and an output coupled to the wake input, the first input being a reading from the pressure sensor, the second input being the vacuum threshold determined in response to the vehicle-off event, and the output being a voltage based on a difference between the first input and the second input.

12. The system of claim 11, wherein the powertrain control module is further configured to sleep without waking until a voltage at the wake input attains a threshold.

13. The system of claim 12, wherein the comparator circuit outputs a zero voltage to the wake input when the reading from the pressure sensor reaches the vacuum threshold.

14. The system of claim 10, wherein the powertrain control module is further configured to:
responsive to vacuum in the evaporative emissions system not reaching the vacuum threshold,
not wake up until a subsequent vehicle-on; and
wherein the powertrain control module is further configured to:
upon waking up at the subsequent vehicle-on,
determine a degraded evaporative emissions system responsive to each of the vacuum in the evaporative emissions system not reaching the vacuum threshold and a decrease in ambient temperature greater than a threshold decrease.

15. A method, comprising:
controlling fuel delivered to an engine by a controller;
before turning off the controller after shutdown of the engine, estimating pressure an evaporative emissions system would achieve after the shutdown based on ambient conditions and fuel conditions;
determining whether a vapor leak exists in the evaporative emissions system after the controller turnoff in response to a comparison of actual pressure of the evaporative emissions system to the estimated pressure; and
outputting a result indicating an absence of the vapor leak in response to the actual pressure being equal to the estimated pressure.

16. The method of claim 15, wherein the controller is awakened in response to the actual pressure being equal to the estimated pressure, and wherein the controller outputs the result that indicates the absence of the vapor leak.

17. The method of claim 15, further comprising indicating the vapor leak responsive to the actual pressure not attaining the estimated pressure and a decrease in ambient temperature greater than a threshold after the controller turnoff.

18. The method of claim 15, wherein fuel delivered to the engine is controlled based on one or more of an engine load, an engine speed, and an air-fuel ratio, and wherein the shutdown of the engine includes shutting down the engine to rest.

19. A method, comprising:
following a vehicle-off event, waking an electronic controller to indicate an absence of a vapor leak in an evaporative emissions system responsive to vacuum in the evaporative emissions system attaining a vacuum threshold, the vacuum threshold determined at the vehicle-off event by the electronic controller and the vacuum threshold based on ambient conditions and fuel conditions; and enabling a sleep mode of the electronic controller after indicating the absence of the vapor leak.

* * * * *